(12) United States Patent
Wang et al.

(10) Patent No.: US 11,301,109 B1
(45) Date of Patent: Apr. 12, 2022

(54) COMPUTING DEVICE WITH NEW WINDOW CREATION COMMAND AND RELATED SYSTEMS AND METHODS

(71) Applicant: CITRIX SYSTEMS, INC., Fort Lauderdale, FL (US)

(72) Inventors: Hengbo Wang, Jiangsu (CN); Daowen Wei, Jiangsu (CN); Feng Tao, Jiangsu (CN); Jian Ding, Jiangsu (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/209,541

(22) Filed: Mar. 23, 2021

Related U.S. Application Data

(63) Continuation of application No. PCT/CN2021/079239, filed on Mar. 5, 2021.

(51) Int. Cl.
*G06F 3/04812* (2022.01)
*G06F 3/04815* (2022.01)

(52) U.S. Cl.
CPC ...... *G06F 3/04812* (2013.01); *G06F 3/04815* (2013.01)

(58) Field of Classification Search
None
See application file for complete search history.

(56) References Cited

U.S. PATENT DOCUMENTS

| | | | |
|---|---|---|---|
| 2010/0011316 A1* | 1/2010 | Sar | G06F 9/451 715/784 |
| 2016/0378334 A1* | 12/2016 | Liu | G06F 1/1686 715/794 |

FOREIGN PATENT DOCUMENTS

| JP | 2012174234 A | * | 9/2012 |
|---|---|---|---|
| JP | 2014013490 A | * | 1/2014 |

* cited by examiner

*Primary Examiner* — Mandrita Brahmachari
(74) *Attorney, Agent, or Firm* — Allen, Dyer, Doppelt + Gilchrist, PA

(57) ABSTRACT

A method is for operating a GUI on a display, the GUI having existing windows. The method may include receiving a window creation command and a current screen of the GUI with the existing windows, and the window creation command may have an original window size value and an original window position value. The method may include dividing the current screen of the GUI into different content regions, each different content region having a region size value, and a region position value. The method may include classifying each of the different content regions as a content type from a different content types, generating a new window position value, and generating a new window creation command including the original window size value and the new window position value, and forwarding the new window creation command to the GUI.

20 Claims, 19 Drawing Sheets

COMPUTING DEVICE WITH NEW WINDOW CREATION COMMAND AND RELATED SYSTEMS AND METHODS

RELATED APPLICATIONS

This application is a continuation of PCT application serial no. PCT/CN2021/079239 filed Mar. 5, 2021, which is hereby incorporated herein in its entirety by reference.

TECHNICAL FIELD

The present disclosure relates to computing systems, and more particularly, to a computing system for controlling access to a physical space.

BACKGROUND

A multi-monitor environment is the use of multiple physical display devices, such as monitors, in order to increase the area available for programs and applications running on a single computer system. As an alternative to multiple physical display devices, a single large monitor may be used where the monitor is split into multiple virtual monitors. Regardless of method, the typical screen real estate for a computer is growing.

With large screens, it may be problematic to utilize the entire screen real estate efficiently. This problem is made all the more present with the wide adoption of 4 k and 8 k monitors. The core of the issue is that most applications are simply not designed to render well on such high resolution displays. Moreover, most operation systems window management tools may not address this issue well enough. This results in users manually positioning windows to maximize functionality.

Of course, anytime a new window is created, the user must reorient all existing windows again. Since new windows are routinely created in multi-application environments, this arrangement may be frustrating to the user.

SUMMARY

Generally, a computing device may include a display, and a processor coupled to the display. The processor may be configured to provide a graphical user interface (GUI) on the display, the GUI comprising a plurality of existing windows. The processor may be configured to receive a window creation command and a current screen of the GUI with the plurality of existing windows. The window creation command may include an original window size value and an original window position value. The processor may be configured to divide the current screen of the GUI into a plurality of different content regions, each different content region having a region size value, and a region position value, and classify each of the plurality of different content regions as a content type from a plurality of different content types. The processor may be further configured to generate a new window position value based upon the original window size value, the respective region size values, the respective region position values, and the respective content types of the plurality of different content regions, generate a new window creation command comprising the original window size value and the new window position value, and forward the new window creation command to the GUI.

More specifically, the plurality of different content types may comprise a transient content type, a static content type, and a blank content type. The classifying may include masking the current screen of the GUI with a background image, and classifying matching content regions as the blank content type. The classifying may comprise performing a transient content detection algorithm to classify non-matching content regions as the transient content type.

In some embodiments, the static content type may include an active static content type and an inactive static content type. The classifying may comprise processing historical GUI interaction to classify non-matching content regions as one of the active static content type and the inactive static content type.

Additionally, the processor may be configured to generate a visual obfuscation metric for each of the plurality of different content regions, and sort the plurality of different content regions based upon the visual obfuscation metric. The processor may be configured to generate the visual obfuscation metric based upon an amount of overlap for the original window size value positioned over a respective different content region, and the content type of the respective different content region. The processor may be configured to divide a given existing window into respective different content regions. The processor may also be configured to merge adjacent different content regions with a same content type.

Another aspect is directed to a computing system comprising at least one server configured to provide a virtual computing session comprising a GUI, and a client computing device in communication with the at least one server and configured to access the virtual computing session via a communications network. The at least one server may be configured to receive a window creation command and a current screen of the GUI with the plurality of existing windows. The window creation command may include an original window size value and an original window position value. The at least one server may be configured to divide the current screen of the GUI into a plurality of different content regions, each different content region having a region size value, and a region position value, and classify each of the plurality of different content regions as a content type from a plurality of different content types. The at least one server may be configured to generate a new window position value based upon the original window size value, the respective region size values, the respective region position values, and the respective content types of the plurality of different content regions. The at least one server may be configured to generate a new window creation command comprising the original window size value and the new window position value, and forward the new window creation command to the GUI.

Yet another aspect is directed to a method of operating a GUI on a display. The method may comprise receiving a window creation command and a current screen of the GUI with the plurality of existing windows, the window creation command comprising an original window size value and an original window position value. The method may also include dividing the current screen of the GUI into a plurality of different content regions, each different content region having a region size value, and a region position value. The method may further comprise classifying each of the plurality of different content regions as a content type from a plurality of different content types, and generating a new window position value based upon the original window size value, the respective region size values, the respective region position values, and the respective content types of the plurality of different content regions. The method may include generating a new window creation command comprising the original window size value and the new window position value, and forwarding the new window creation command to the GUI.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
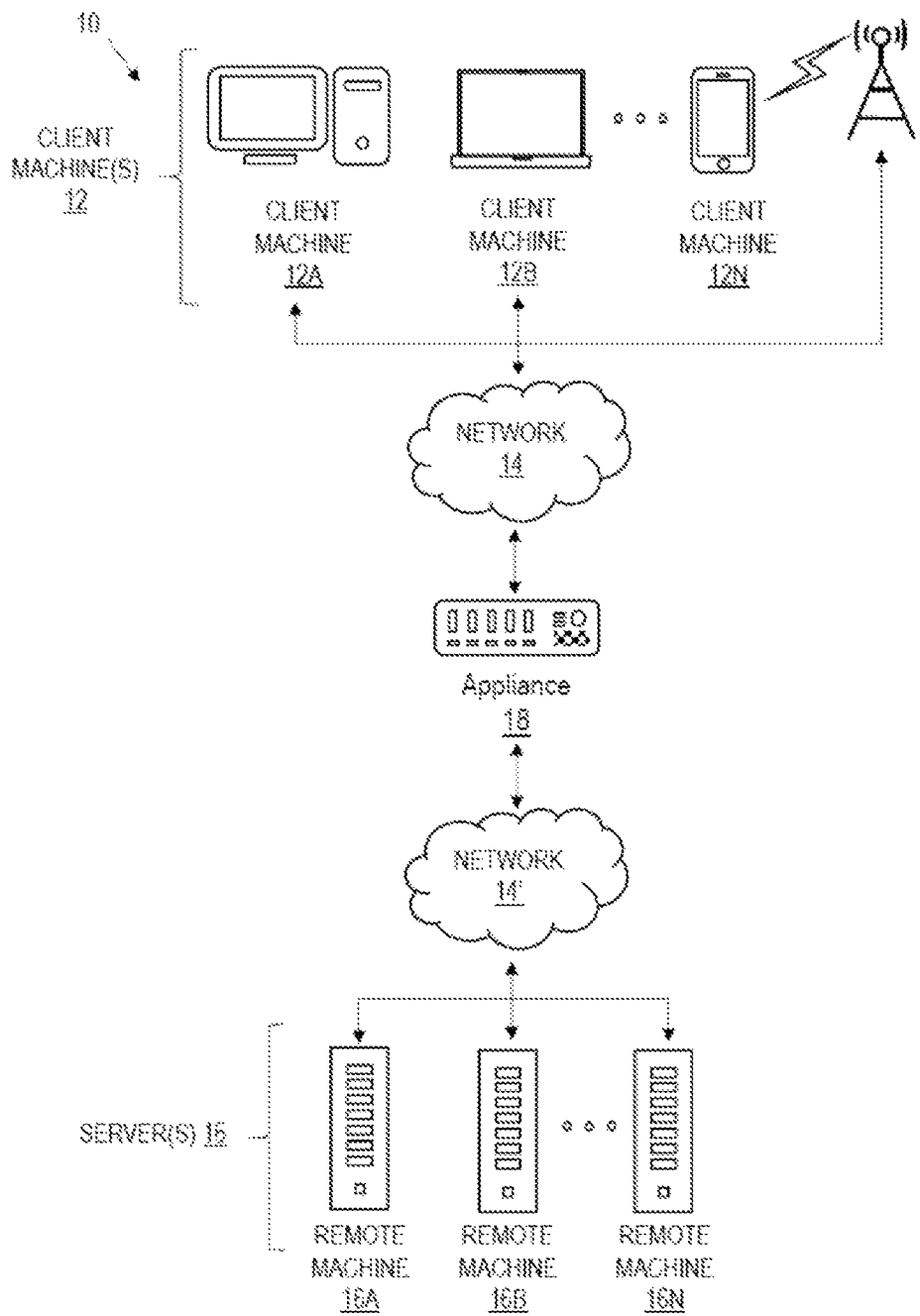
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
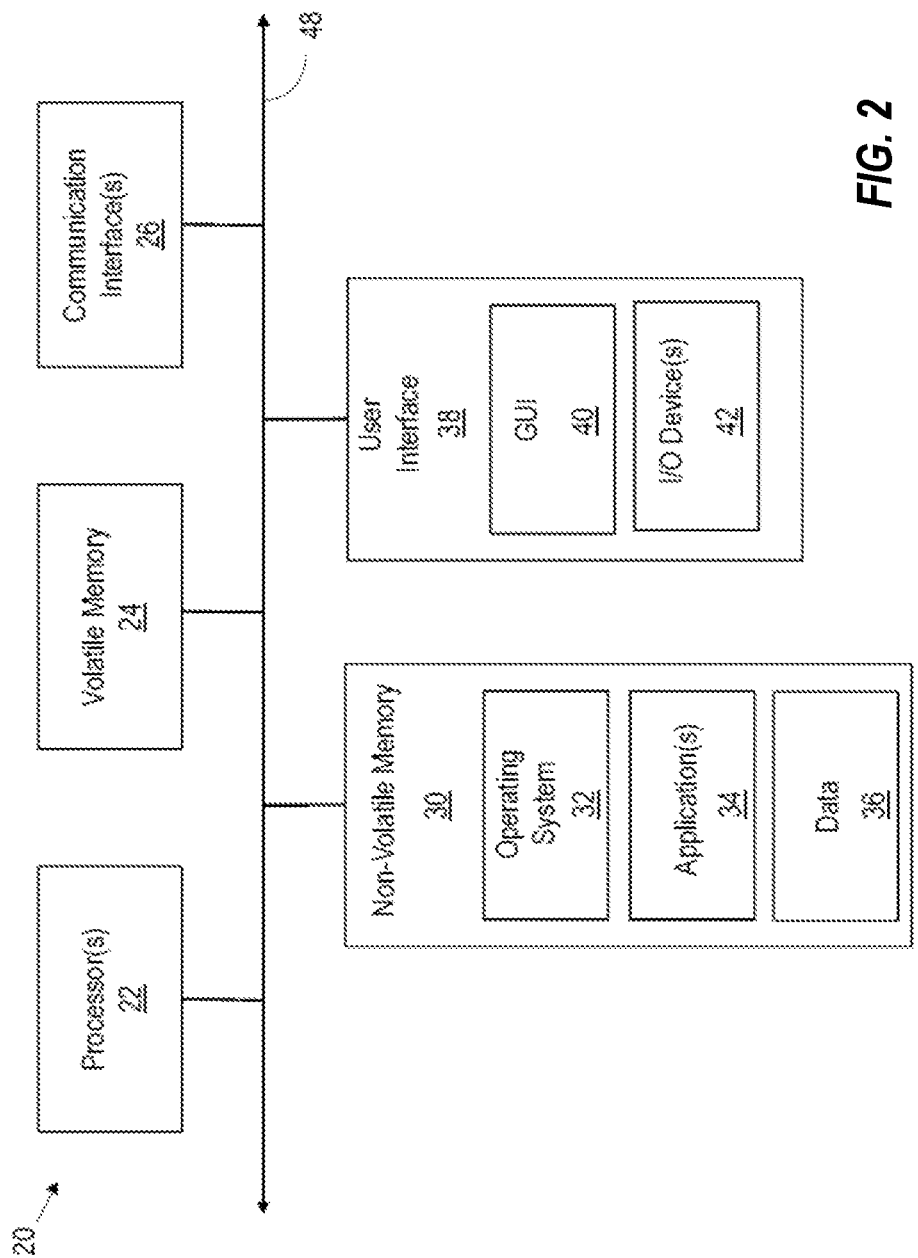
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a GUI 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
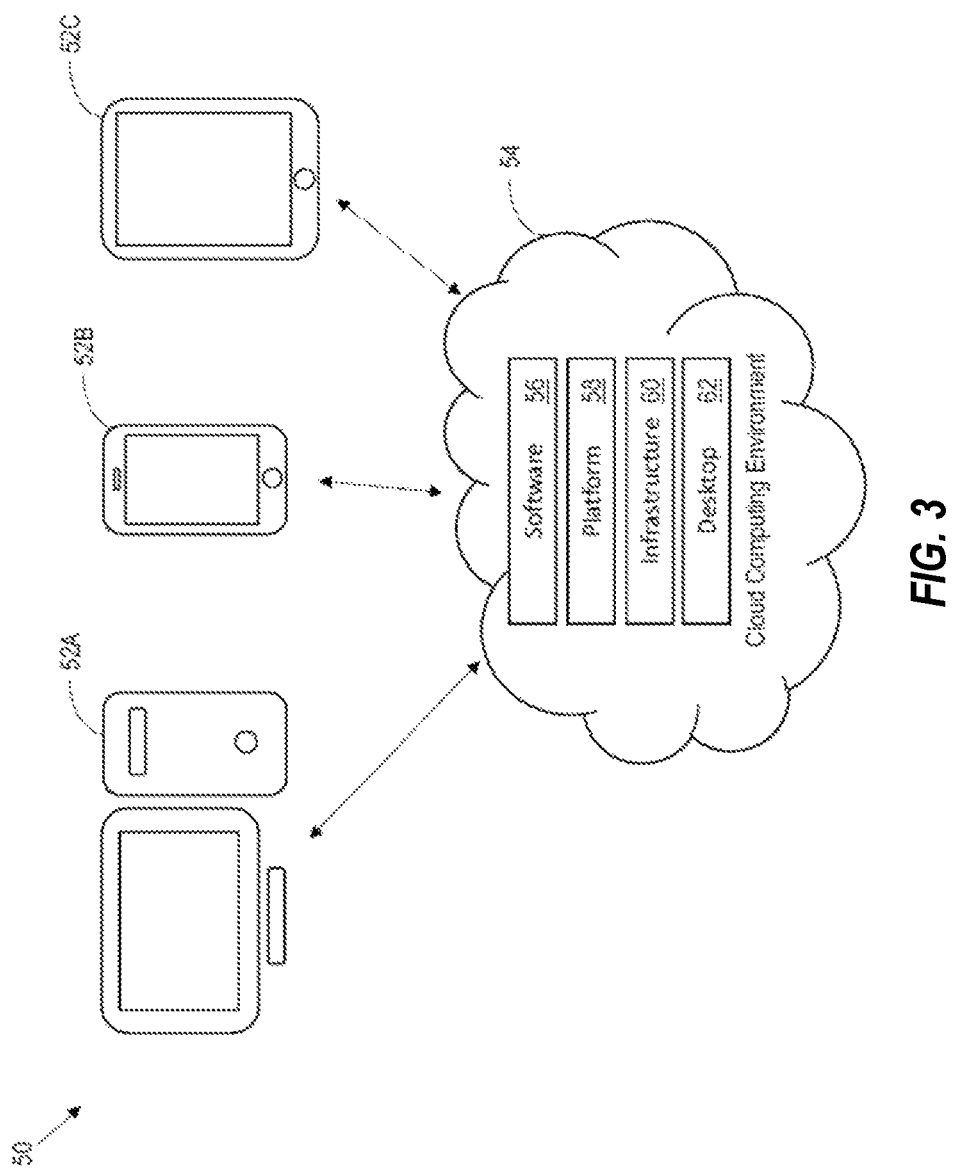
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHT-SCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
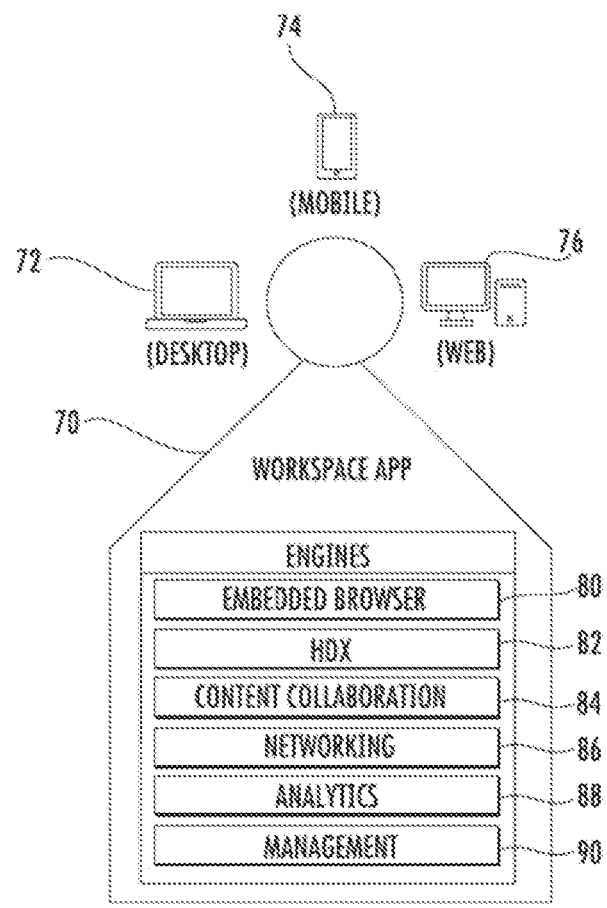
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
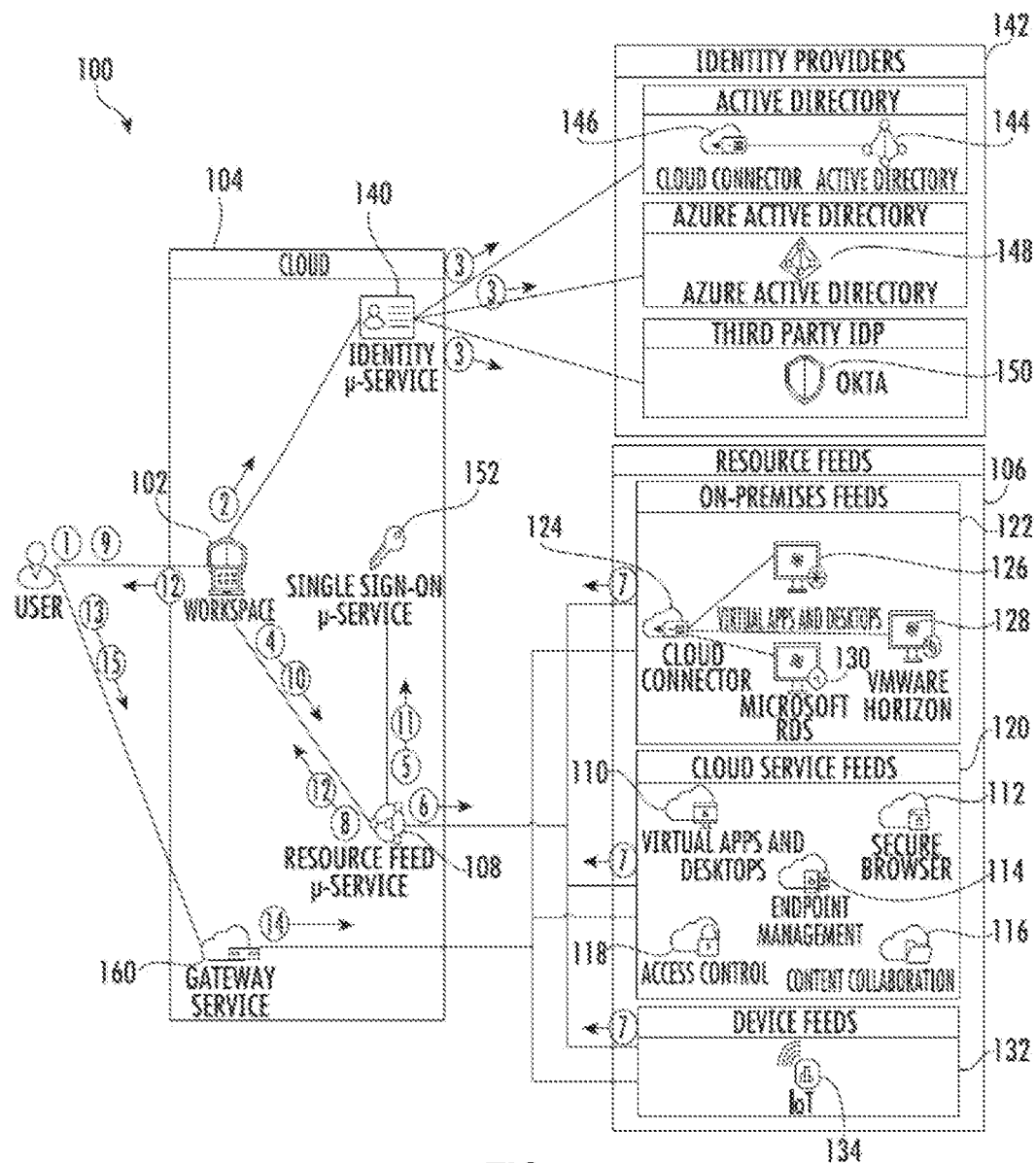
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Referring now to FIGS. 6-7 & 8A-8B, a computing device 200 according to the present disclosure is now described. Also, a method of operating the computing device 200 is also described with reference to a flowchart 2000, which begins at Block 2001. The computing device 200 illustratively includes a display 201 (e.g. multi-monitor display or single monitor display), and a processor 202 coupled to the display. The processor 202 is configured to provide a GUI 203 (e.g. the illustrated window based GUI) on the display

Figure 11:
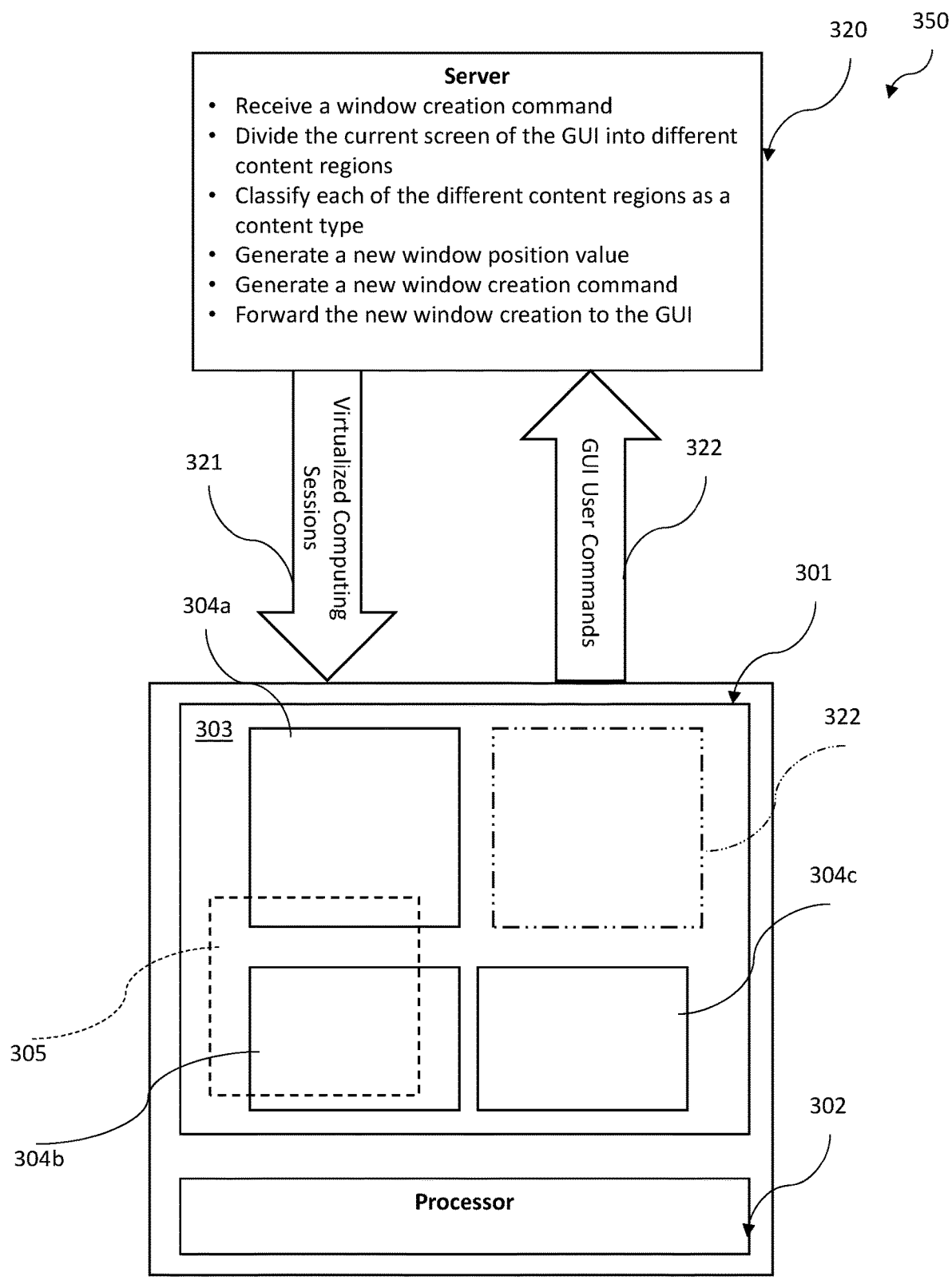
FIG. 11 is schematic block diagram of a computing system in which various aspects of the disclosure may be implemented.
Figure 12A:
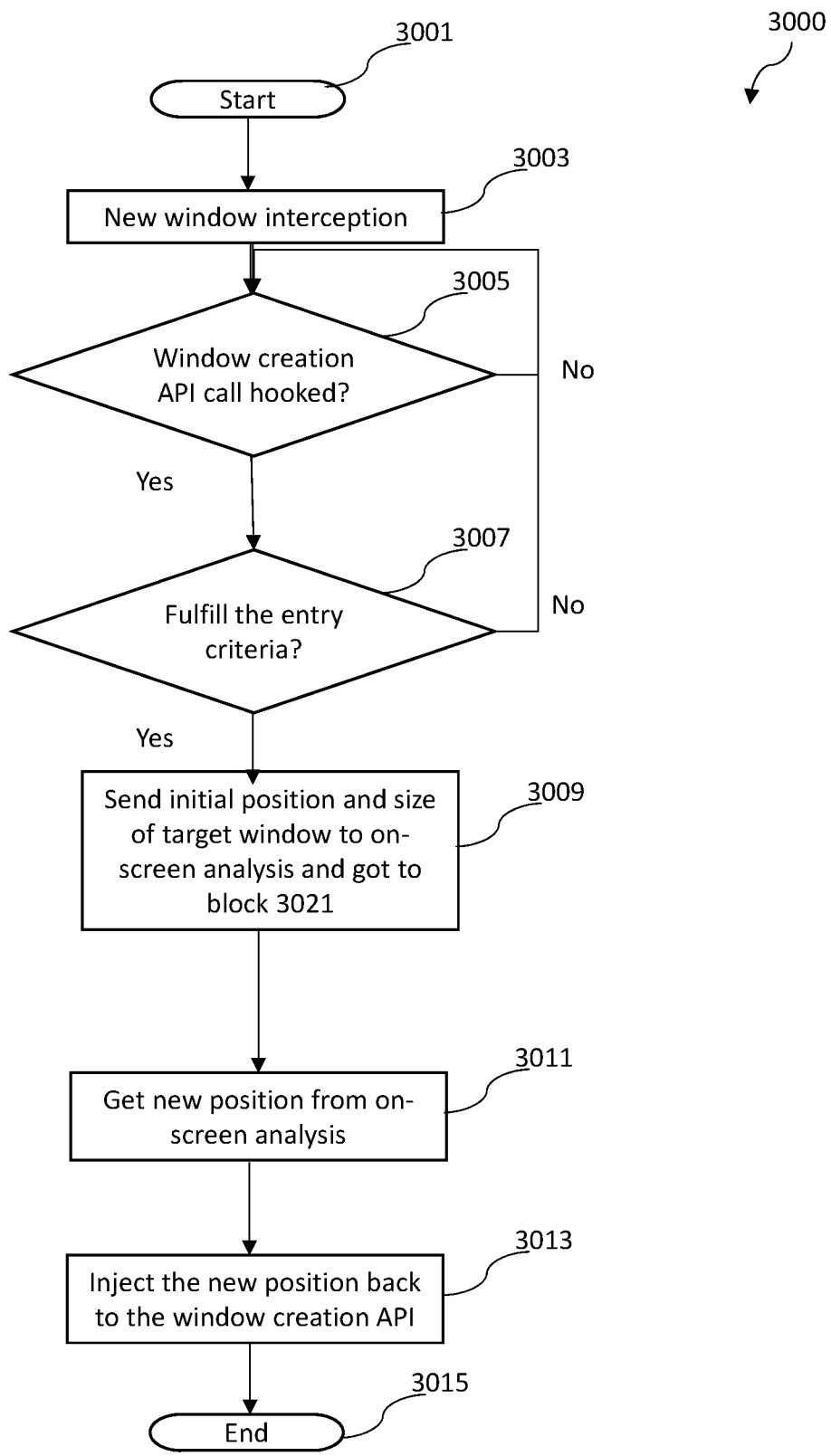
FIGS. 12A-12D are yet another flowchart for operation of the computing device of FIG. 6 or the computing system of FIG. 11, according to an example embodiment.
Figure 12B:
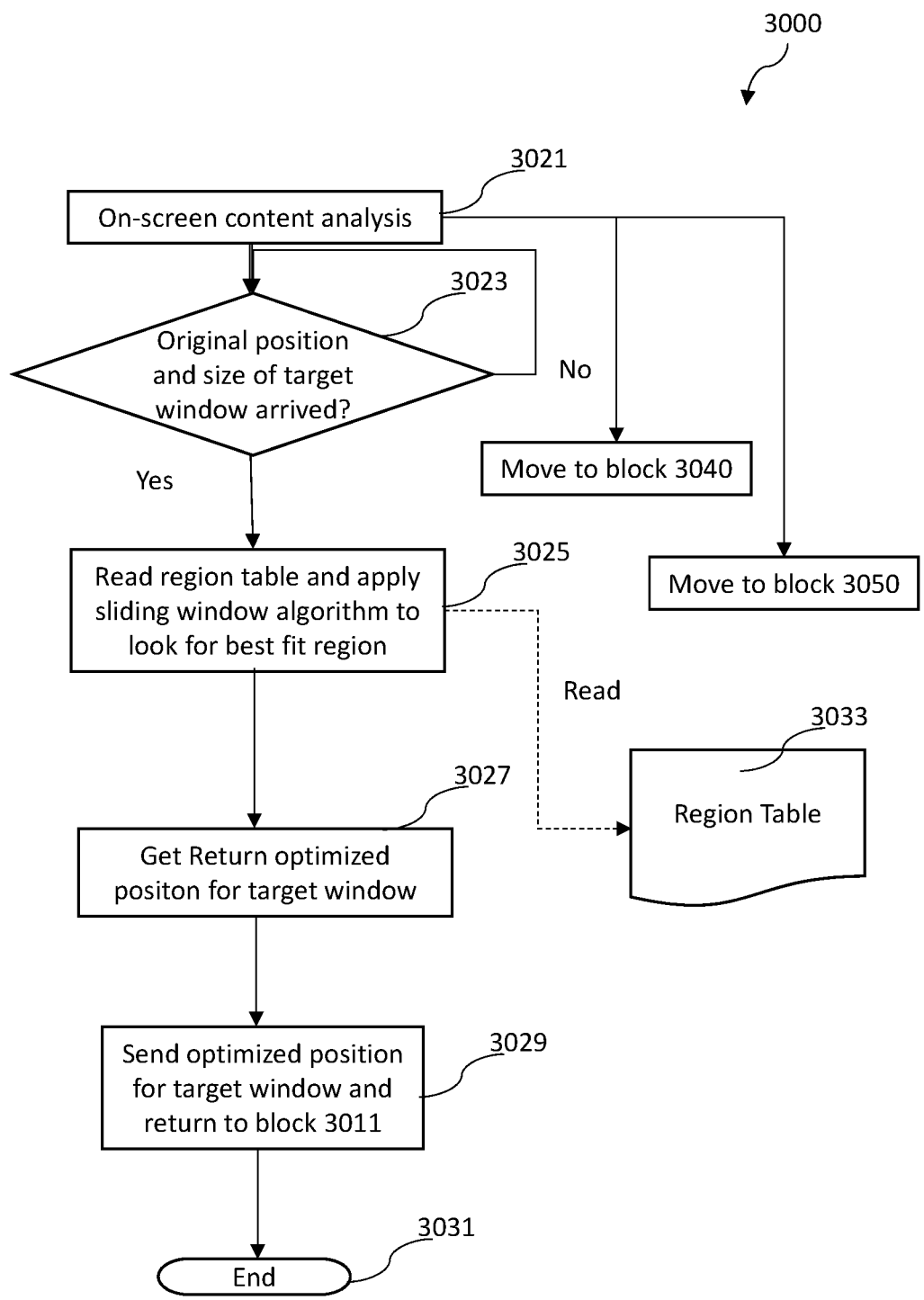
Figure 12C:
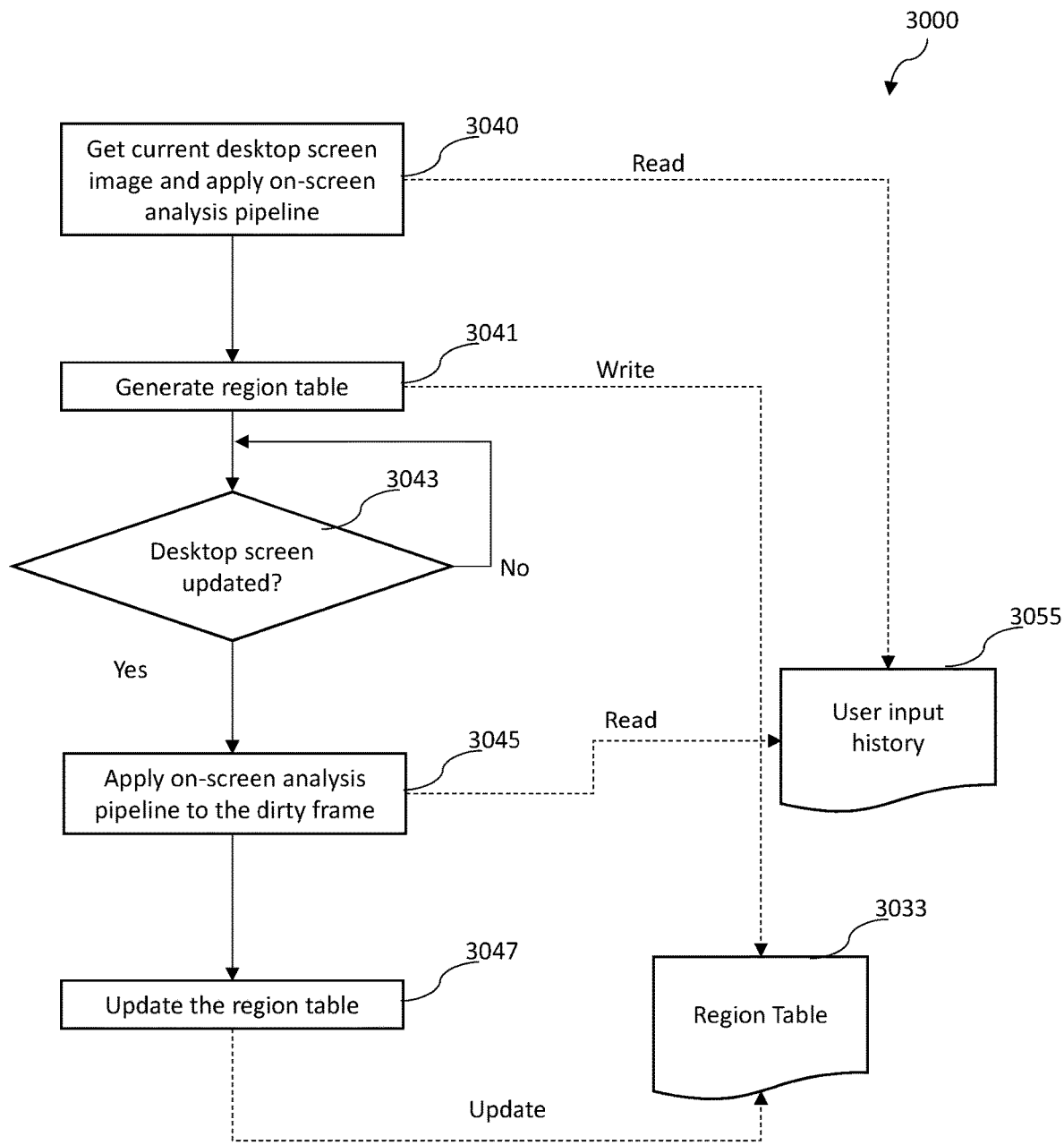
Figure 12D:
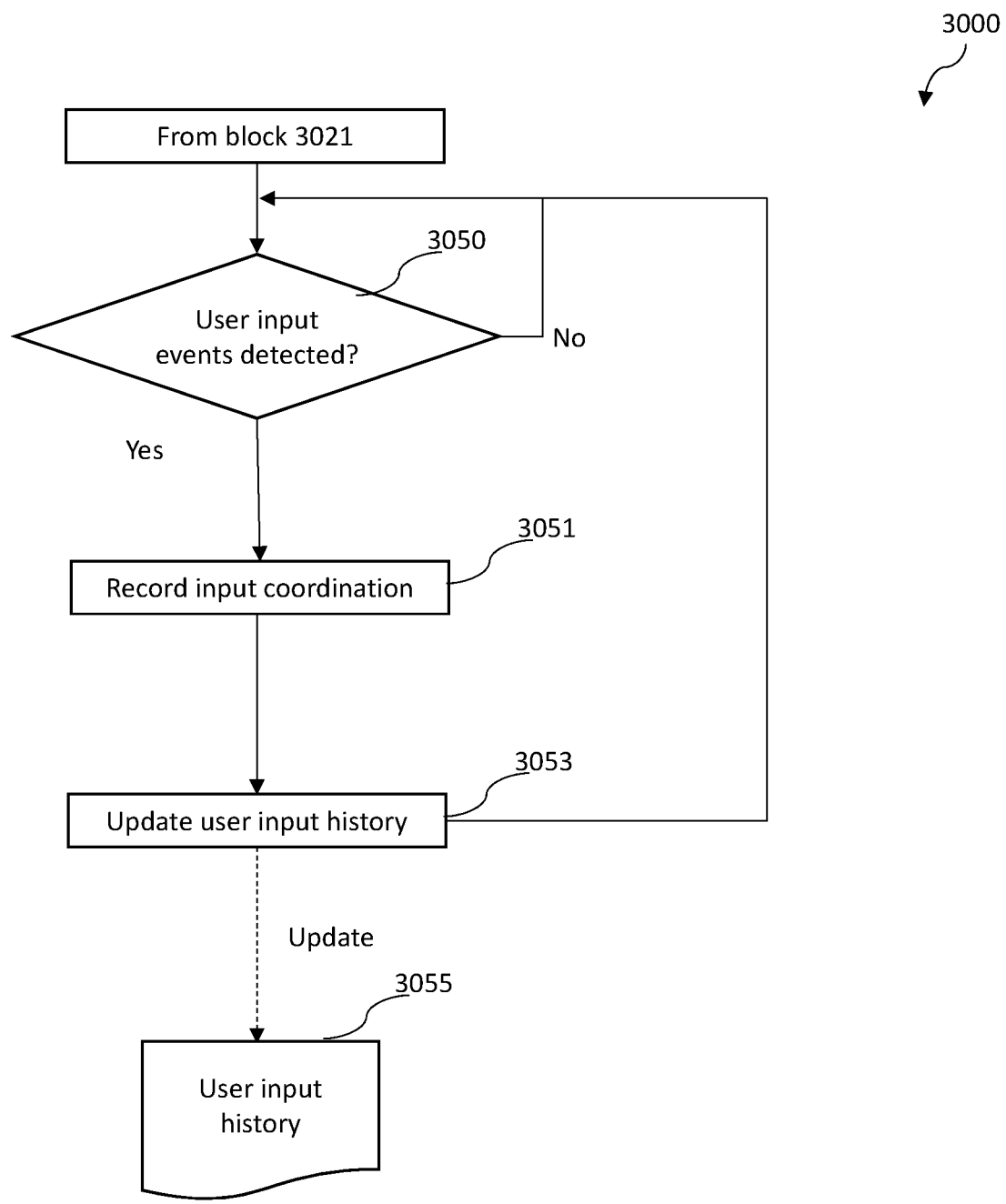
Figure 13:
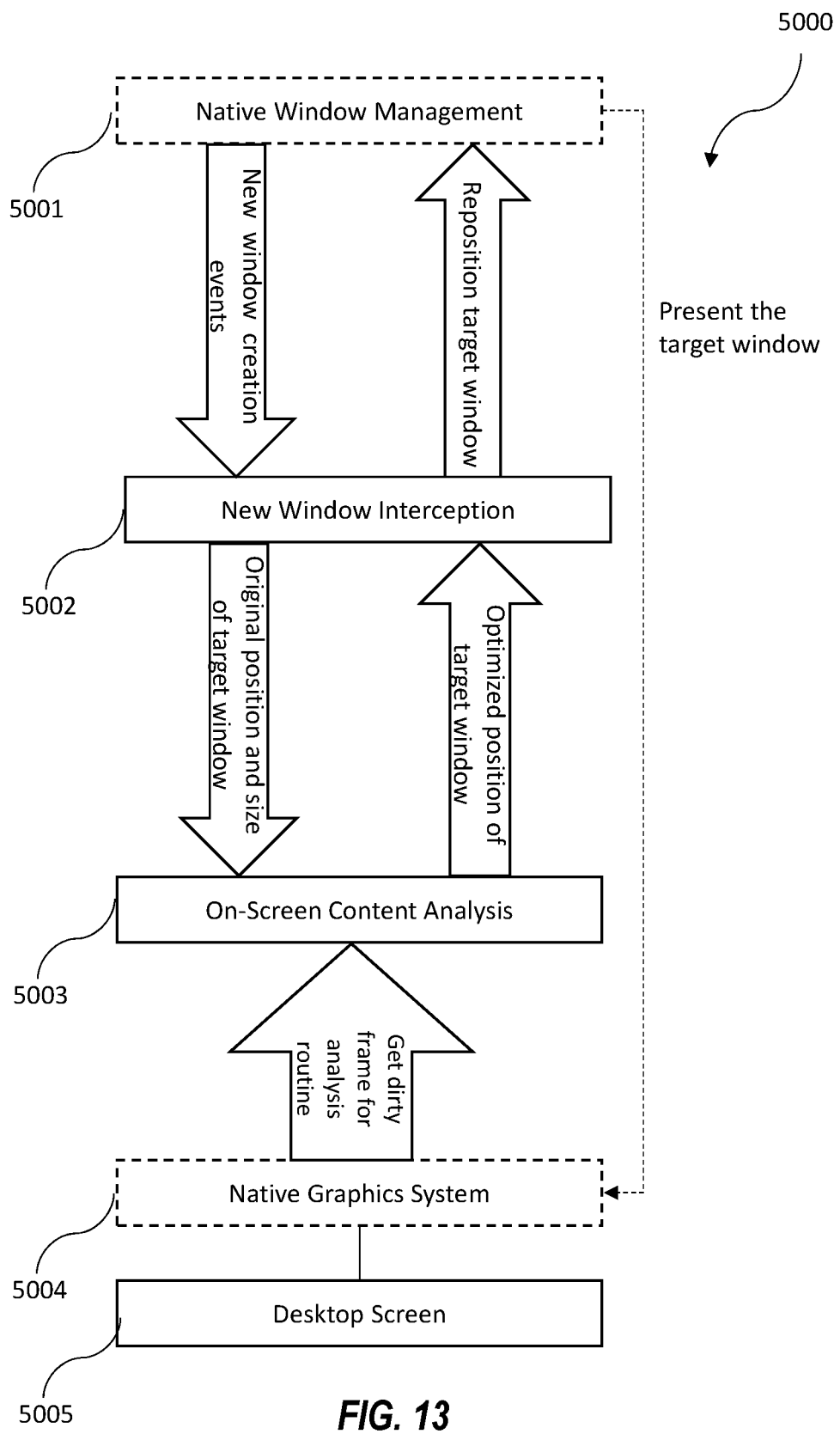
FIG. 13 is a schematic diagram of system architecture from the computing device of FIG. 6 or the computing system of FIG. 11, according to an example embodiment.

201. The GUI 203 illustratively includes a plurality of existing windows 204a-204c. In other words, a user of the computing device 200 has generated the plurality of existing windows 204a-204c. Although this embodiment is illustratively shown as a standalone computing device, it should be appreciated that the teachings herein can be applied to virtualized operating systems, such as shown in the embodiment of FIG. 11.

The processor 202 is configured to receive a window creation command for creating a new window 205. In some embodiments, the processor 202 is configured to receive the window creation command within the GUI 203, but in other embodiments, the processor is configured to receive the window creation command at the OS level (i.e. intercepted before being sent to the GUI). The window creation command may be generated directly from user interaction with running applications, or may be of pop-up variety, generated independently of user input. The processor 202 is configured to receive a current screen 206 of the GUI 203 with the plurality of existing windows 204a-204c, thereby providing a current state of the GUI. (Block 2003). In typical approaches, the new window 205 would be placed in default position without consideration of the plurality of existing windows 204a-204c. Of course, this may result in the new window 205 overlapping one or more of the plurality of existing windows 204a-204c. As discussed hereinabove, this may be less desirable for the user and cause inefficiencies in workflow.

The window creation command includes an original window size value and an original window position value (i.e. the default window position value) for the new window 205. The original window position value comprises an initial coordinate (x, y) of the new window 205 upper-left corner. In the following, the origin (0, 0) of the coordinate system is assumed to be in the upper left corner, but this is merely exemplary and other coordinate systems may be used. The original window size value comprises a width*height (e.g. in pixels) of the new window 205. For example, when the original window size value equals 100*100, and the original window position value is (0, 0), the 100*100 window would be placed in the upper left corner, and extend diagonally to point (100, 100).

The processor 202 is configured to divide the current screen 206 of the GUI 203 into a plurality of different content regions 207a-207d. (Block 2003). Each different content region 207a-207d has a region size value, and a region position value. In some embodiments, the processor 202 is configured to divide the current screen 206 of the GUI 203 into equal sized content regions 207a-207d (e.g. 16 pixel*16 pixel blocks). As will be appreciated, a smaller content region block size provides for greater precision, but does come at the cost of computational resources. Moreover, although each different content region 207a-207d is illustratively rectangle-shaped, other shapes may be used in other embodiments. As perhaps best shown in FIG. 7, the processor 202 is configured to subdivide a given existing window 204a into respective different content regions 207a-207d.

The processor 202 is configured to classify, for example, in sequential fashion, each of the plurality of different content regions 207a-207d as a content type from a plurality of different content types. More specifically, the plurality of different content types may comprise a transient content type (e.g. video), an active static content type (e.g. currently edited document), an inactive static content type (e.g. dormant document), and a blank content type (i.e. blank space in the GUI 203). Each different content type has a respective tolerance to being obfuscated by the new window 205. Starting with the most tolerant blank content type, the inactive static content type is next, and the active static content type follows the inactive static content type. The transient content type is the least tolerant to obfuscation by the new window 205.

In the illustrated embodiment, the classifying method proceeds via process by elimination. Firstly, the classifying includes masking the current screen 206 of the GUI 203 with a background image (i.e. the background image of the desktop of the GUI) (Block 2005), and classifying matching content regions 207a-207d as the blank content type. (Blocks 2007, 2011). Once the blank content type regions have been filtered out, the classifying comprises performing a transient content detection algorithm to classify remaining non-matching content regions 207a-207d as the transient content type. (Blocks 2009, 2013). As will be appreciated, any suitable algorithm for detecting transient properties in image data can be used.

Once the transient content type regions have been filtered out, the classifying comprises processing historical GUI interaction to classify remaining non-matching content regions 207a-207d as one of the active static content type and the inactive static content type. (Blocks 2015, 2017, 2019). In particular, the processor 202 is configured to determine whether a remaining content region 207a-207d has had any user input within a set time period (e.g. 1 minute, 15 seconds). When there has been user input within the set time period, the processor 202 is configured to classify the content region 207a-207d as the active static content type (Block 2017), otherwise the processor is configured to classify the content region as the inactive static content type.

Once all the different content regions have been classified (Block 2016), the processor 202 is configured to merge adjacent different content regions with a same content type, simplifying the overall mapping. (Block 2021). Also, the processor 202 is configured to generate a content region table, providing a convenient data structure for storing the content region 207a-207d mapping. (Block 2023). For example, the content region table may comprise an entry format of: region number; vertex coordinate; region size (Width*Height); and content tag (i.e. content region type).

Figure 7:
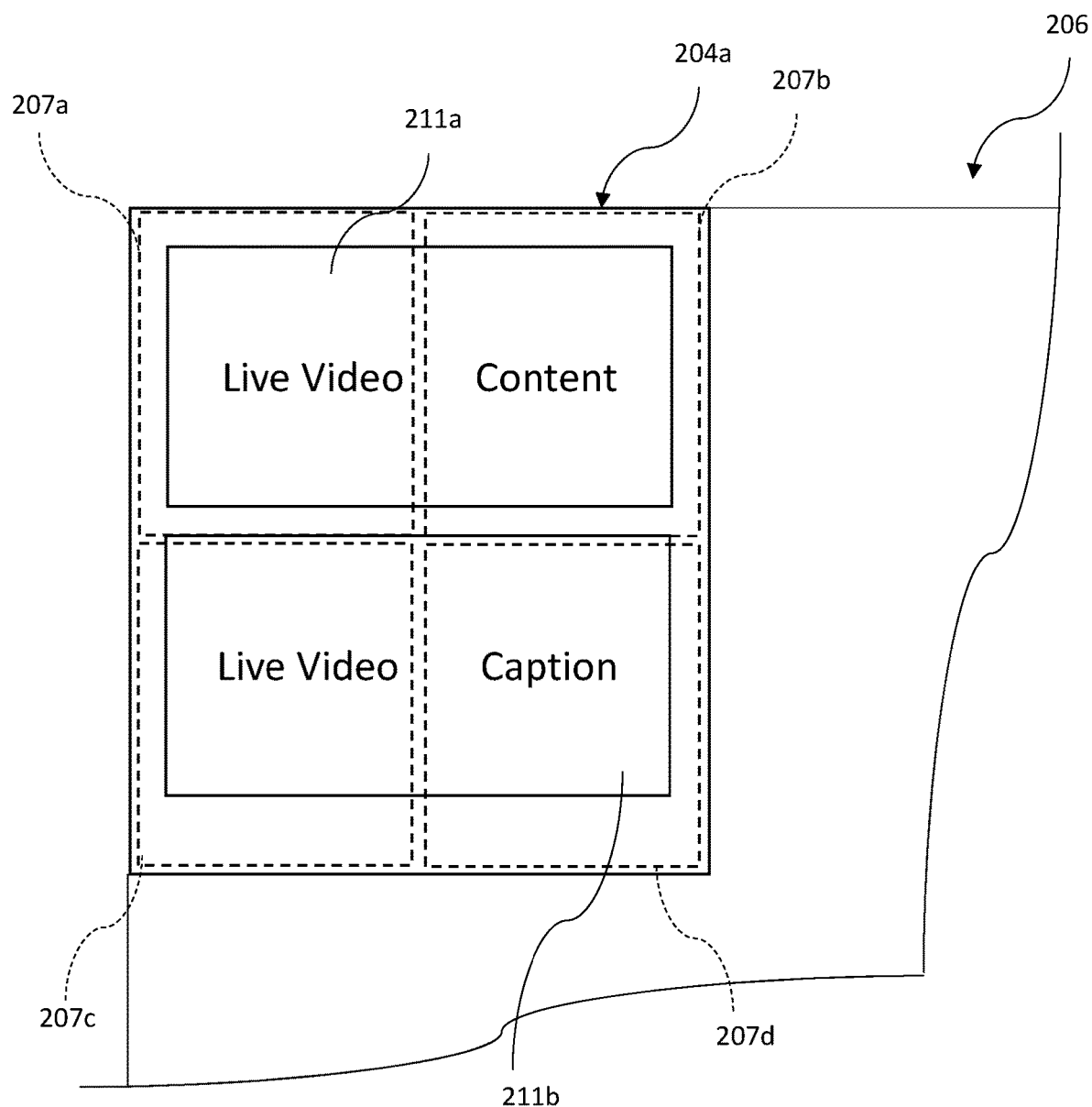
FIG. 7 is a schematic diagram of a current screen from the computing device of FIG. 6.
Figure 8A:
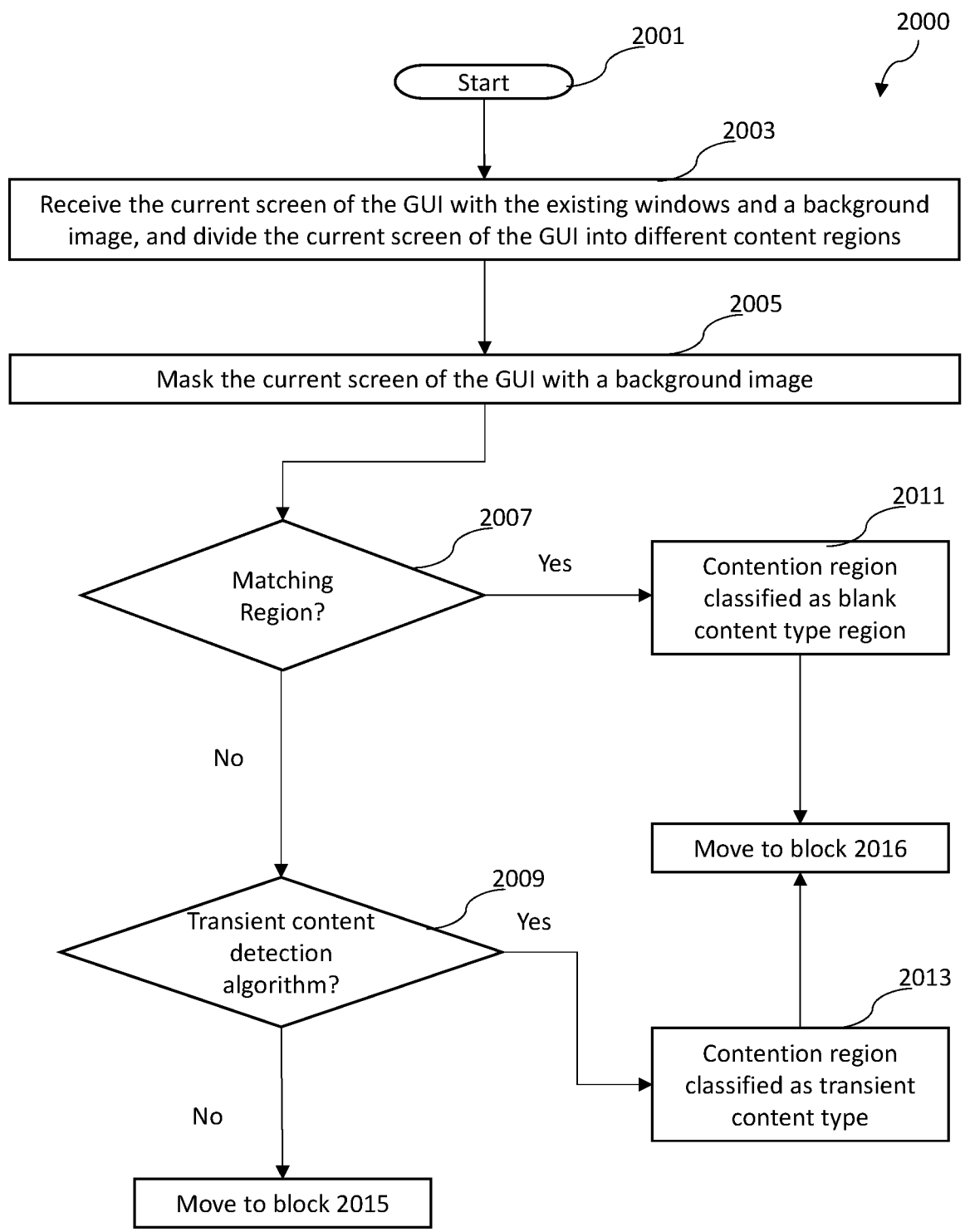
FIGS. 8A-8B are a flowchart for operation of the computing device of FIG. 6, according to an example embodiment.
Figure 8B:
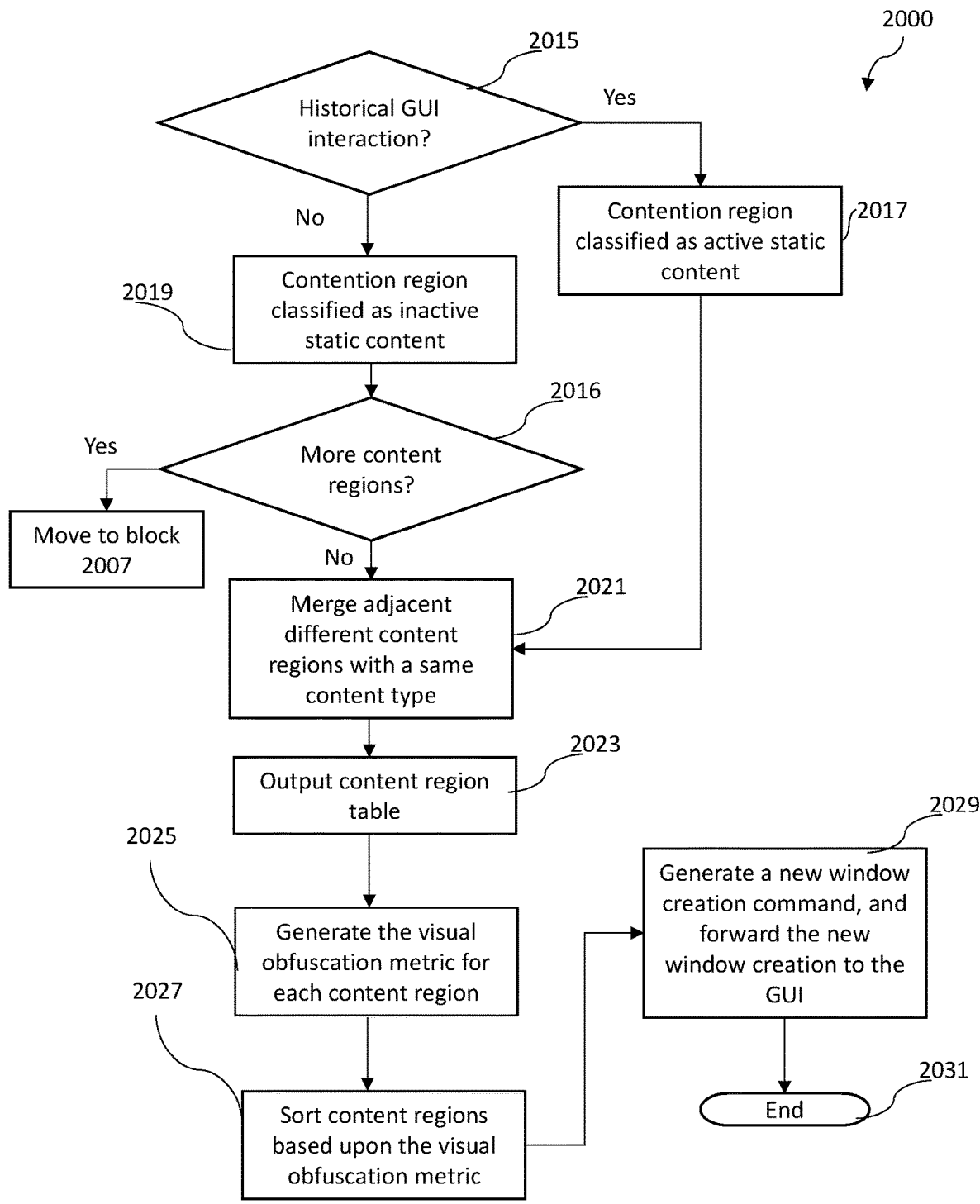
Figure 9A:
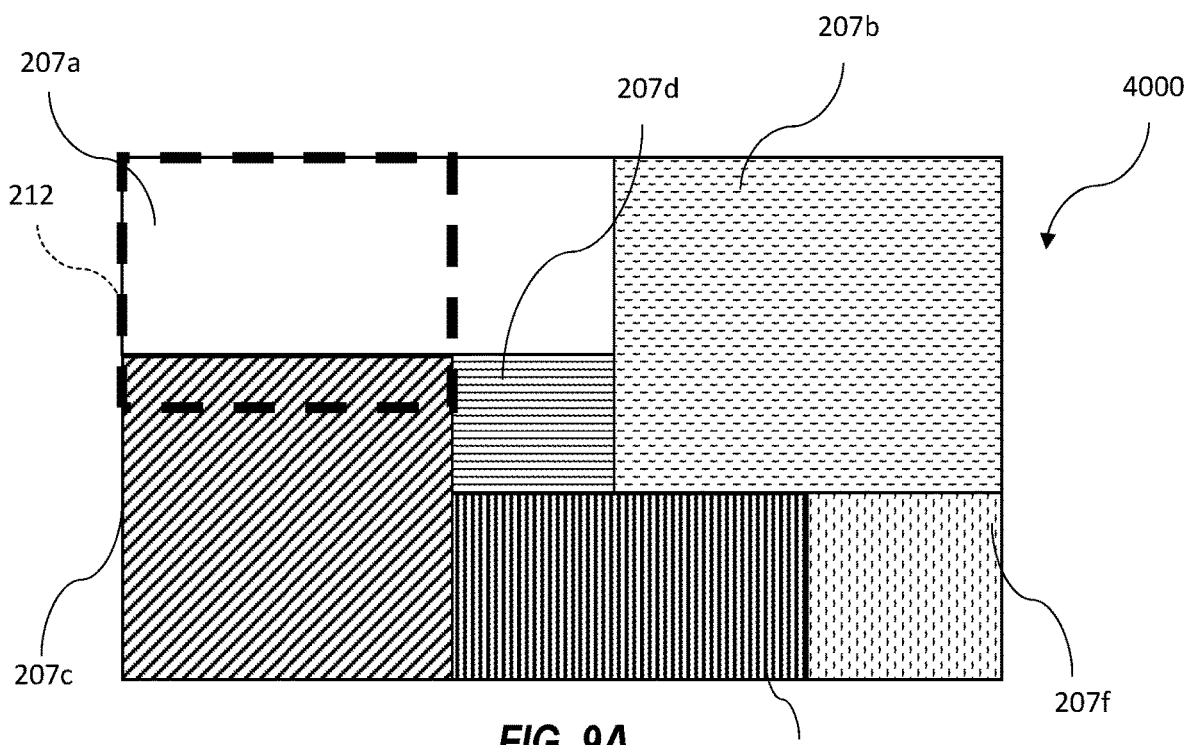
FIGS. 9A-9F are schematic diagrams of content regions during a selection algorithm in the computing device of FIG. 6, according to an example embodiment.
Figure 9B:
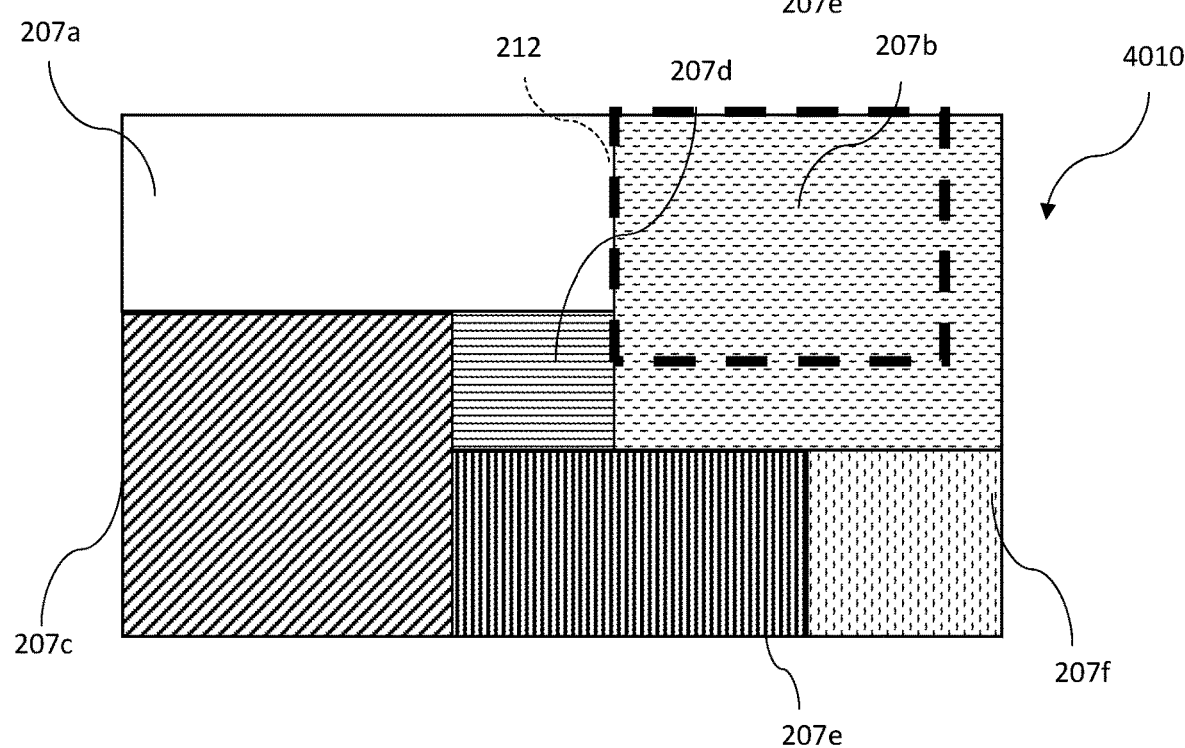
Figure 9C:
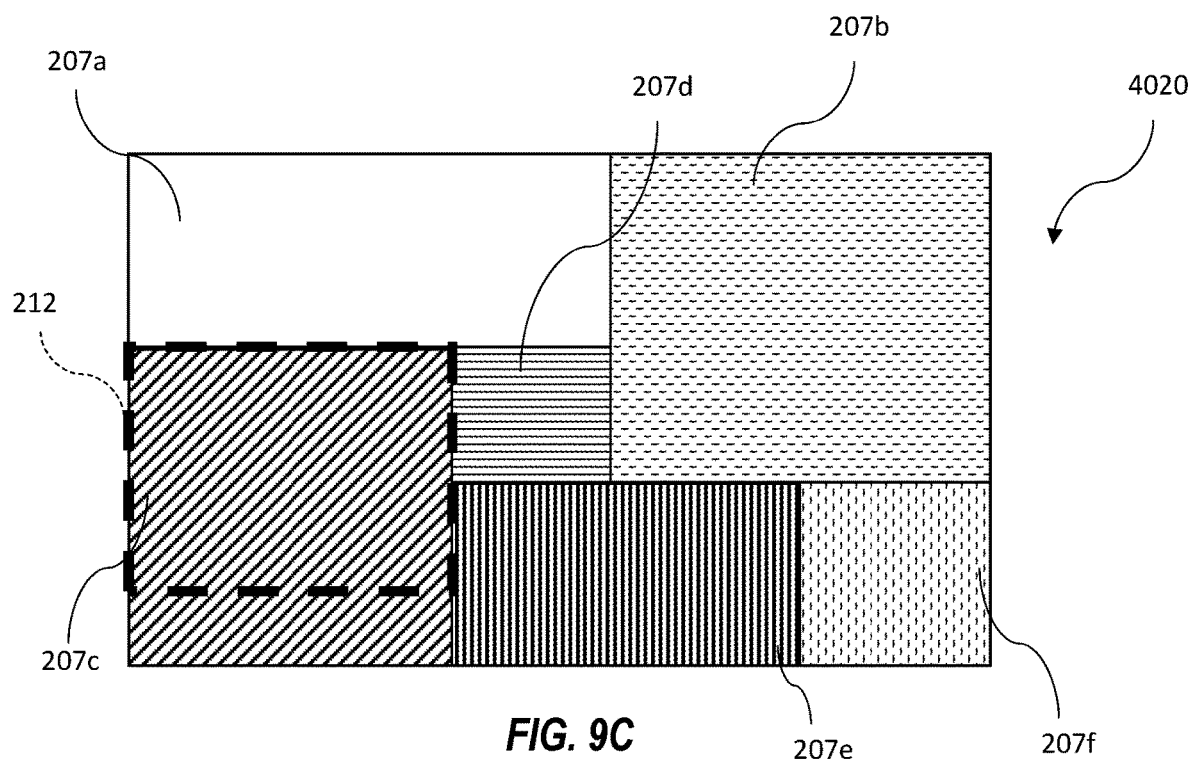
Figure 9D:
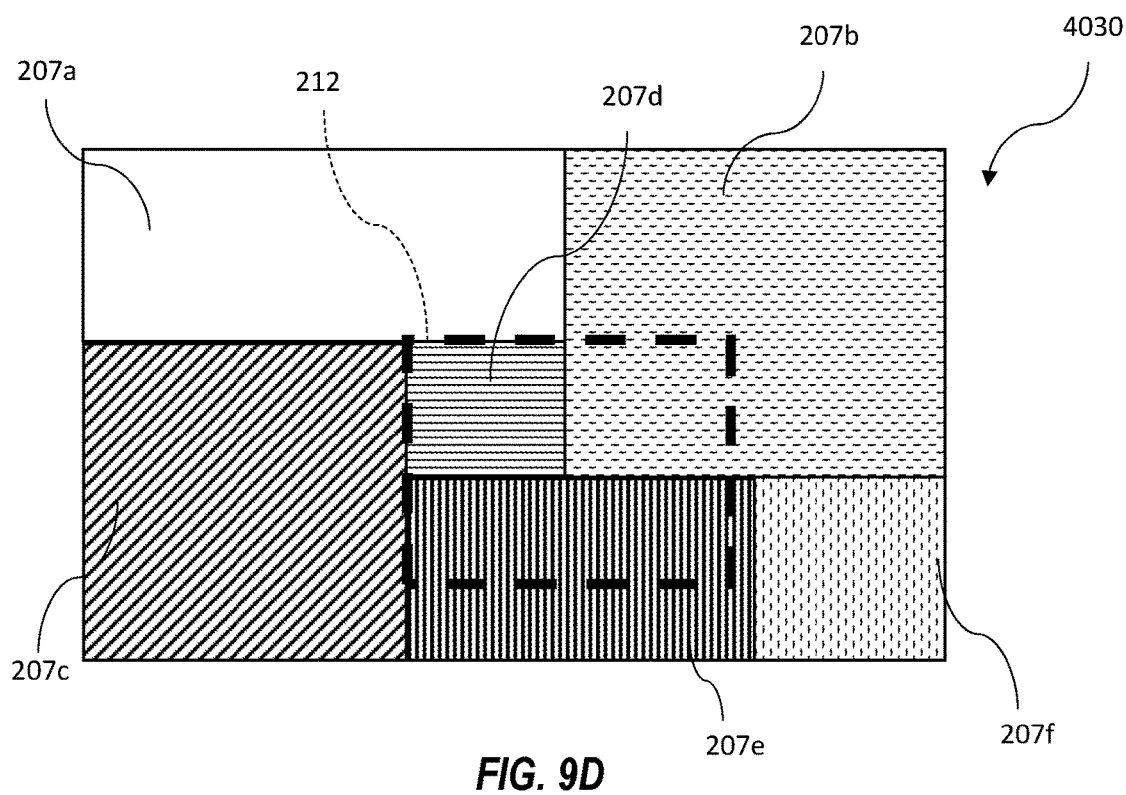
Figure 9E:
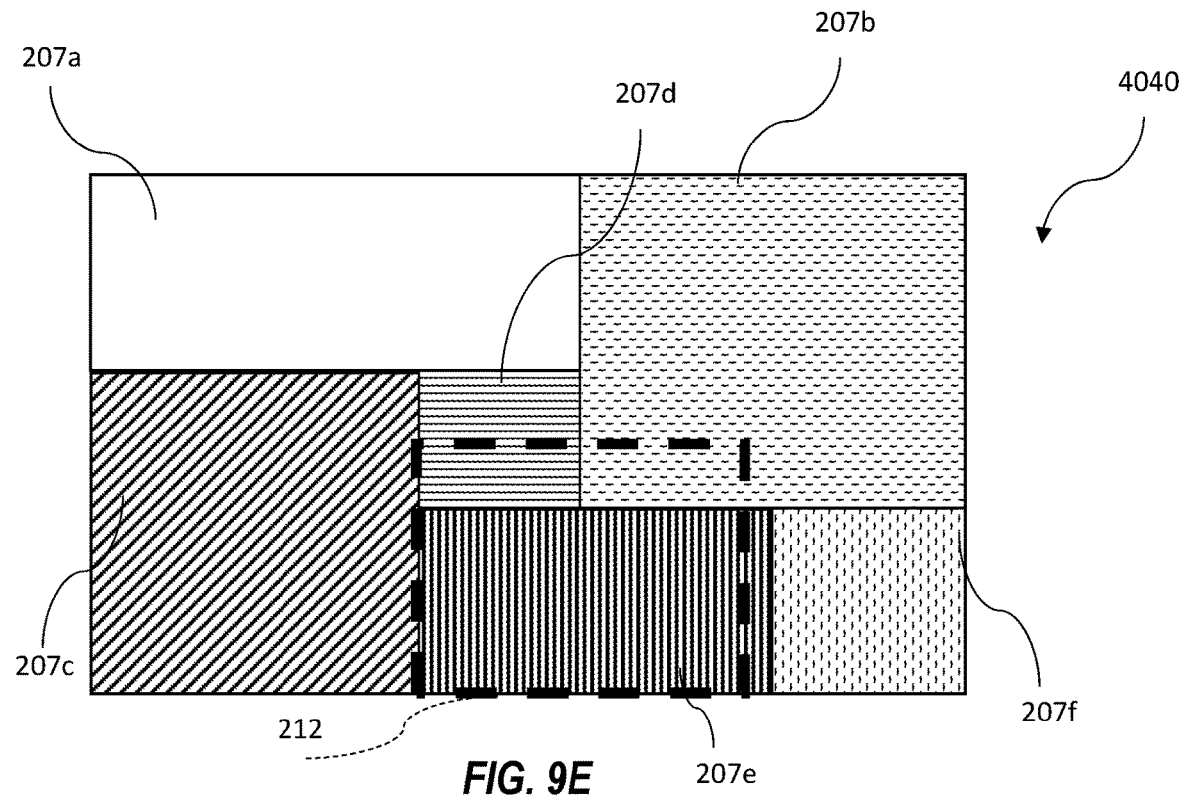
Figure 9F:
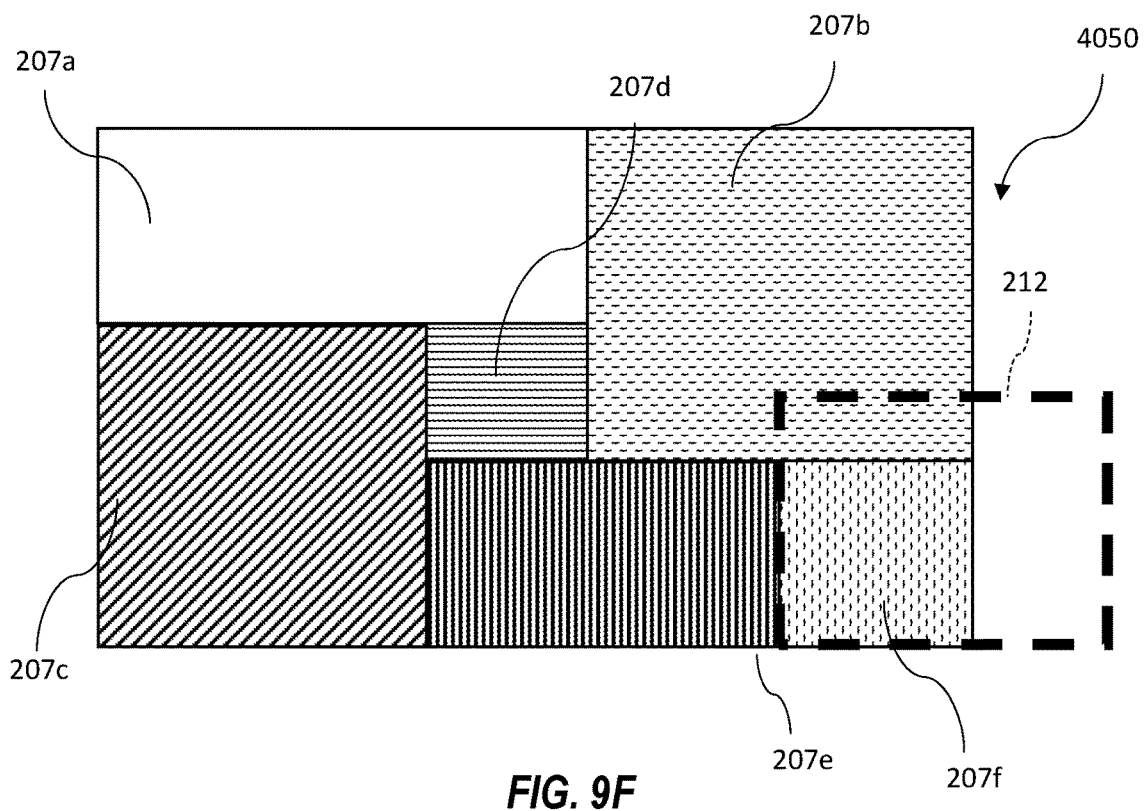

As noted in FIG. 7, each existing window 204a-204c may be subdivided in different type content regions. In the illustrated example, the existing window 204a provides a live video content panel 211a (i.e. transient content type), and a video caption content panel 211b (i.e. inactive static content type). Here, the existing window 204a is subdivided into four different content regions 207a-207d; the bottom two content regions are classified as the inactive static content type (i.e. assuming no user input within the set time period) while the top two content regions are classified as the transient content type. Helpfully, the processor 202 is configured to parse each of the plurality of existing windows 204a-204c into subparts to provide the best placement of the new window 205.

The processor 202 is configured to generate a visual obfuscation metric for each of the plurality of different content regions 207a-207d, and sort the plurality of different content regions based upon the visual obfuscation metric. (Blocks 2025, 2027). The processor 202 is configured to generate the visual obfuscation metric based upon an amount of overlap for the original window size value positioned over a respective different content region 207a-207d, and the content type of the respective different content region, thereby providing a quantitative value for the problematic nature of blocking any one of the plurality of existing windows 204*a*-204*c*.

In some embodiments, the visual obfuscation metric (i.e. visual influence degree (VID)) is provided by the following formula and used within a sliding window algorithm described herein.

$$VID(\text{cursor rectangle, region}\#i) = \begin{cases} \sum_j \frac{\text{Overlapped Area with region } j}{\text{Area of the cursor rectangle}} * bc \text{ (type of region } j) \\ +\infty, \text{ only if the cursor rectangle has some part out of the screen} \end{cases} ; \quad (1)$$

where bc(Transient content type)=1.0, bc(active static content type)=0.8, bc(inactive static content type)=0.5, bc(blank content type)=0.1; where k=2; and where ε=0.05.

Referring now to FIGS. 9A-9F, an exemplary application of the sliding window algorithm is applied to find the best fit for the new window 205, with reference to diagrams 4000, 4010, 4020, 4030, 4040, and 4050. In the illustrated example, there are six content regions 207*a*-207*f* with the following respective content classifications: region 1 (207*a*): blank content type; region 2 (207*b*): transient content type; region 3 (207*c*): inactive static content; region 4 (207*d*): blank content type; region 5 (207*e*): active static content; and region 6 (207*f*): inactive static content.

Once the processor 202 receives the original window position value and the original window size value of the new window 205, it can form a cursor rectangle 212 standing for the new window within the current screen 206. Then it goes though the region table and looks up a best-fit (i.e. optimized) position to place the new window 205 via the sliding window algorithm. Of course, it should be appreciated that the sliding window algorithm is exemplary, and other heuristic algorithms may be used in its place.

The sliding window algorithm is finding the best fit by creating the cursor rectangle 212 and placing it on top of and aligned with each content region 207*a*-207*f*. If the cursor rectangle 212 completely falls into a blank content region for the first content region 207*a*-207*f*, then the processor 202 does nothing, and returns the original window position value as the new window position value. Otherwise, for each content region 207*a*-207*f* in the region table, slide the vertex of the cursor rectangle 212 to the same position as the respective content region (i) vertex, and calculate the visual obfuscation metric relative to content region (i) by formula 1. As will be appreciated, this process is iterative, and the obfuscation metric is calculated for each content region 207*a*-207*f*. Next, the processor 202 is configured to sort all visual obfuscation metric values in ascending order and select top k regions whose visual obfuscation metric values have difference less than E. The processor 202 is configured to find a region among the k regions, to whom the cursor rectangle 212 slides will block the least amount of the content region. If more than one region can be found, the processor 202 is configured to select the content region 207*a*-207*f* with the minimum visual obfuscation metric value. The processor 202 is configured to return vertex coordinate of the content region 207*a*-207*f* found in as the optimized position.

In particular, for the illustrated example, diagram 4000 shows the cursor rectangle 212 aligned with the first content region 207*a*; diagram 4010 shows the cursor rectangle 212 aligned with the second content region 207*b*; diagram 4020 shows the cursor rectangle 212 aligned with the third content region 207*c*; diagram 4030 shows the cursor rectangle 212 aligned with the fourth content region 207*d*; diagram 4040 shows the cursor rectangle 212 aligned with the fifth content region 207*e*; and diagram 4050 shows the cursor rectangle 212 aligned with the sixth content region 207*f*.

For this example, the best fit position is deemed to be on top of the first content region 207*a*, as shown in diagram 4000. The reason for this is straightforward, and because the first content region 207*a* is of the blank content type (i.e. the easiest content type to block). Also, the mild overlap of the third content region 207*c* is tolerable since it has the inactive static content (i.e. the second easiest content type to block).

More specifically, using the above formula 1, and assuming the cursor rectangle 212 has a size of 256 pixels*192 pixels, the obfuscation metric for each of the six content regions 207*a*-207*f* is:
VID (cursor region, region #1)=0.23
VID (cursor region, region #2)=1
VID (cursor region, region #3)=0.5
VID (cursor region, region #4)=0.63
VID (cursor region, region #5)=0.8
VID (cursor region, region #6)=+∞
Here, since the obfuscation metric has the minimum value for the first content region 207*a*, the optimal placement is over the first content region. Here, the new window position value 213 is set to be the region position value for the first content region 207*a*, i.e. 0, 0 (top left corner).

Generally, the processor 202 is configured to generate a new window position value 213 based upon the original window size value, the respective region size values, the respective region position values, and the respective content types of the plurality of different content regions. (Block 2029). In particular, the processor 202 is configured to set the new window position value 213 to equal the region position value of the respective best fit content region generated by the sliding algorithm and the obfuscation metric values.

Figure 6:
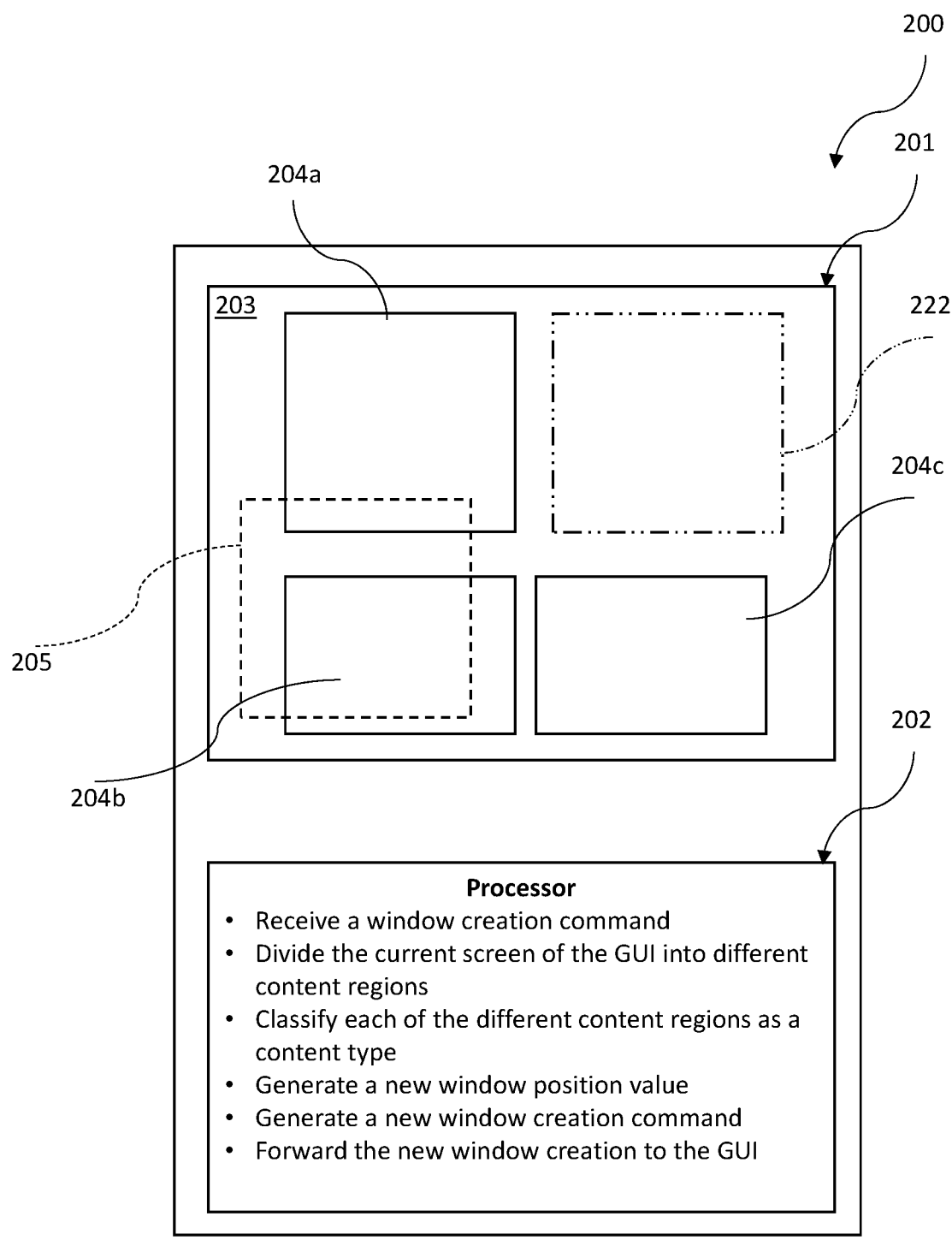
FIG. 6 is a schematic block diagram of a computing device in which various aspects of the disclosure may be implemented.

For example, the illustration in FIG. 6 represents a similar scenario. In this instance, the processor 202 is configured to place the new window 205 in the upper right content region, which comprises a blank content type content region.

Again, in instances where the cursor rectangle 212 at its original position fits entirely into a content region of the blank content type, the processor 202 is configured to return the original position as the new window position value 213. Of course, this is the intuitive response since the new window 205 would not obfuscate any of the plurality of existing windows 204*a*-204*c*. Moreover, while iteratively evaluating each content region 207*a*-207*f*, if the cursor rectangle 212 falls entirely within a blank content type region, the process ends and outputs the current region position value as the new window position value 213.

The processor 202 is configured to generate a new window creation command comprising the original window size value and the new window position value, and forward the new window creation command to the GUI 203. (Block 2031). In particular, the processor 202 is configured to inject the new window creation command into the GUI 203.

Figure 10:
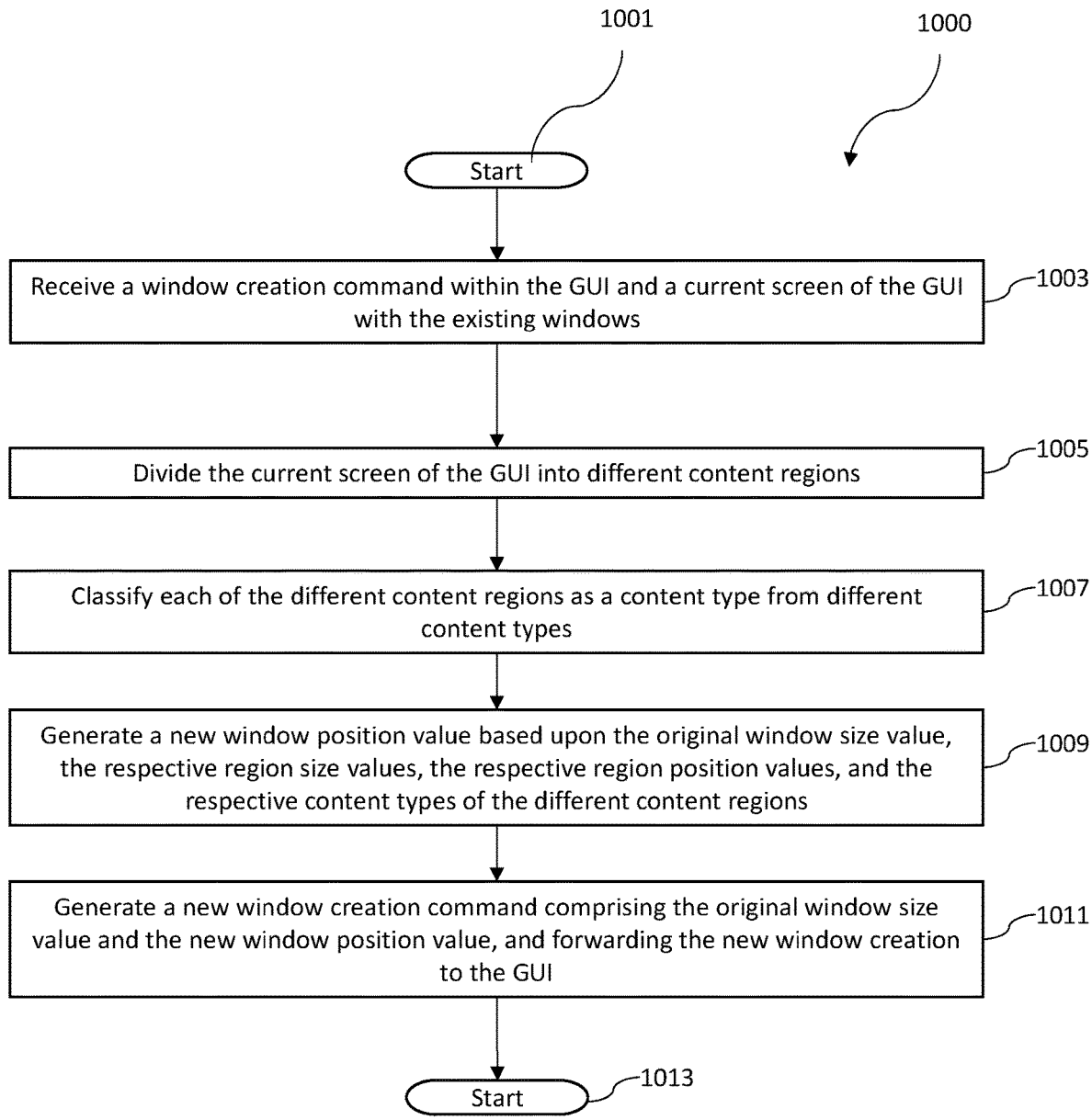
FIG. 10 is another flowchart for operation of the computing device of FIG. 6, according to an example embodiment.

Referring now additionally to FIG. 10, a method of operating a GUI 203 on a display 201 is now described with reference to a flowchart 1000, which begins at Block 1001. The method illustratively includes receiving a window creation command within the GUI 203 and a current screen 206 of the GUI with the plurality of existing windows 204*a*-204*c*. (Block 1003). The window creation command comprises an original window size value and an original window position value. The method also includes dividing the current screen 206 of the GUI 203 into a plurality of different content regions 207a-207d, each different content region having a region size value, and a region position value. (Block 1005). The method further comprises classifying each of the plurality of different content regions 207a-207d as a content type from a plurality of different content types (Block 1007), and generating a new window position value based upon the original window size value, the respective region size values, the respective region position values, and the respective content types of the plurality of different content regions. (Block 1009). The method illustratively comprises generating a new window creation command comprising the original window size value and the new window position value, and forwarding the new window creation command to the GUI 203. (Blocks 1011, 1013).

Referring now additionally to FIG. 11, a computing system 350 is now described. In this embodiment of the computing system 350, those elements already discussed above with respect to FIGS. 6-9F are incremented by 100 and most require no further discussion herein. This embodiment differs from the previous embodiment in that this computing system 350 illustratively includes a server 320 configured to provide a virtual computing session 321 comprising a GUI 303, and a client computing device 300 in communication with the server and configured to access the virtual computing session via a communications network and provide GUI user commands 322 to the server.

The server 320 is configured to receive a window creation command within the GUI 303 and a current screen 306 of the GUI with the plurality of existing windows 304a-304d. The window creation command includes an original window size value and an original window position value. The server 320 is configured to divide the current screen 306 of the GUI 303 into a plurality of different content regions 307a-307d, each different content region having a region size value, and a region position value, and classify each of the plurality of different content regions as a content type from a plurality of different content types. The server 320 is configured to generate a new window position value based upon the original window size value, the respective region size values, the respective region position values, and the respective content types of the plurality of different content regions. The server 320 is configured to generate a new window creation command comprising the original window size value and the new window position value, and forward the new window creation command to the GUI 303.

Referring now additionally to FIGS. 12A-12D and 13, a method of operating a GUI 203, 303 on a display 201, 301 is now described with reference to a flowchart 3000, which begins at Block 3001, and a diagram 5000. The method illustratively includes a new window interception module 5002 hooking new window creation events occurring in the native window management module 5001. (Blocks 3003, 3005, 3007). The new window interception module 5002 passes an original position and a size of target window, which is going to be presented, to the on-screen content analysis module 5003, which begins at Block 3021. (Block 3009).

The on-screen content analysis module 5003 analyzes the entire image of desktop screen 5005 and divides the desktop screen into different regions, creating the region table 3033. (Blocks 3040, 3041, 3043). Along with screen update, it will also update the division result by getting dirty frame (i.e. content changes anywhere within the entire screen; in this situation, we need to re-analyze the changed parts and re-tag the changed parts) update from the native graphics system 5004 and proceed with delta (i.e. difference) analysis. (Blocks 3045, 3047). Once it receives the original position and size of target window, it locates a best fit region and returns an optimized position for target window. (Blocks 3023, 3025, 3027, 3029, 3031). As will be appreciated, the native window management module 5001 and native graphics system 5004 are part of the operating system (i.e. native), and shown as dashed line blocks.

The user input interaction module is part of the on-screen content analysis module and for each content block, evaluates whether there has been user input. (Blocks 3050, 3051, 3053). The user input is recorded in a user input history 3055.

The new window interception module injects the optimized position of target window back to native window management module 5001 so that the target window is going to be presented at the optimized position, instead of the original position. (Blocks 3011, 3013). The native window management module 5001 contacts the native graphics system 5004 to present the target window in the optimized position. (Block 3015).

This new window interception module 5002 leverages API hooking technique to discover new window creation event that fulfils below entry criteria. (Block 3007). The criteria check-up is done by checking the specified window style upon the window creation. Condition 1: The window to be created is visible and non-transparent. Condition 2: The window to be created is not a child window of an existing window. Condition 3: The window to be created is not a modal window.

The technique could vary depending on operating system platform. For example, for Microsoft Windows, the method comprises hooking the CreateWindow( ) API family, including CreateWindowA( ), CreateWindowExA( ), CreateWindowW( ) and CreateWindowExW( ), from which initial window position, window size and window style can be easily retrieved. For example, some programming code for an implementation is shown here.

void CreateWindowW(
    lpClassName,
    lpWindowName,
    dwStyle, <-can be used to check whether condition 1/2 is met
    x, <-initial x-coordinate
    y, <-initial y-coordinate
    nWidth, <-window width
    nHeight, <-window height
    hWndParent,
    hMenu,
    hInstance,
    lpParam
    );

For new window creation event, which fulfils the criteria, below target window info is recorded and passed to on-screen content analysis module 5003 for further processing. Also, the on-screen content analysis module 5003 defines four types of regions, transient content type, active static content type, inactive static content type, and blank content type. Each content region has different tolerance to being blocked by other windows. And to quantify the tolerance, "block coefficient" (bc for short, bc $\in [0,1]$) is assigned to each region type. Larger block coefficient indicates less tolerance. Then we have bc(transient content type)>bc(Active static content type)>bc(Inactive static content type)>bc(Blank).

| Region Type | Explanation | Tolerance to being blocked |
|---|---|---|
| Transient content type | A region filled by dynamic content, e.g. video, flash | Very Low |
| Active static content type | A region filled by static content, e.g. imagery, document, and with frequent user interaction | Low |
| Inactive static content type | A region filled by static content, e.g. imagery, document, and without frequent user interaction | Medium |
| Blank content type | A region filled by desktop background | High |

In short, the on-screen content analysis module 5003 divides the entire screen into the four different regions by the illustrated pipeline. The on-screen content analysis module 5003 splits the bitmap into a batch of 16*16 cells, and this facilitates further region classification and coordination calculation. The on-screen content analysis module 5003 masks the desktop background image (containing wallpaper and icons) on the bitmap and calculates the difference. The cells falling into the matching part will be tagged with blank content type region. The on-screen content analysis module 5003 applies a transient detector (a mature industry technique) to the non-matching part, and the cells exhibiting transient characteristic will be tagged with transient content type region. The on-screen content analysis module 5003 applies the user input history 3055 to the rest cells. The user input history 3055 is a history that records coordination of keyboard/mouse/gesture input in last x seconds. The cells hitting one or more of those coordination will be tagged with active static content type Region. And, the remaining cells will be tagged with inactive static content type Region. The on-screen content analysis module 5003 merges adjacent cells with the same tag into a rectangle (region).

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A computing device comprising:
a display; and
a processor coupled to said display and configured to
provide a graphical user interface (GUI) on said display, the GUI comprising a plurality of existing windows,
receive a window creation command and a current screen of the GUI with the plurality of existing windows, the window creation command comprising an original window size value and an original window position value,
divide the current screen of the GUI into a plurality of different content regions, each different content region having a region size value, and a region position value,
classify each of the plurality of different content regions as a content type from a plurality of different content types,
generate a visual obfuscation metric for each of the plurality of different content regions based upon an amount of overlap for the original window size value positioned over a respective different content region, and the content type of the respective different content region,
sort the plurality of different content regions based upon the visual obfuscation metric,
generate a new window position value based upon the original window size value, the respective region size values, the respective region position values, the respective content types of the plurality of different content regions, and the respective visual obfuscation metrics of the plurality of different content regions, and
generate a new window creation command comprising the original window size value and the new window position value, and forward the new window creation command to the GUI.

2. The computing device of claim 1 wherein the plurality of different content types comprises a transient content type, a static content type, and a blank content type.

3. The computing device of claim 2 wherein the classifying comprises masking the current screen of the GUI with a background image, and classifying matching content regions as the blank content type.

4. The computing device of claim 3 wherein the classifying comprises performing a transient content detection algorithm to classify non-matching content regions as the transient content type.

5. The computing device of claim 3 wherein the static content type comprises an active static content type and an inactive static content type; and wherein the classifying comprises processing historical GUI interaction to classify non-matching content regions as one of the active static content type and the inactive static content type.

6. The computing device of claim 1 wherein said processor is configured to divide a given existing window into respective different content regions.

7. The computing device of claim 1 wherein said processor is configured to merge adjacent different content regions with a same content type.

8. A computing system comprising:
at least one server configured to provide a virtual computing session comprising a graphical user interface (GUI); and
a client computing device in communication with said at least one server and configured to access the virtual computing session via a communications network, and display the GUI comprising a plurality of existing windows;
said at least one server configured to
receive a window creation command and a current screen of the GUI with the plurality of existing windows, the window creation command comprising an original window size value and an original window position value,
divide the current screen of the GUI into a plurality of different content regions, each different content region having a region size value, and a region position value,
classify each of the plurality of different content regions as a content type from a plurality of different content types,
generate a visual obfuscation metric for each of the plurality of different content regions based upon an amount of overlap for the original window size value positioned over a respective different content region, and the content type of the respective different content region,
sort the plurality of different content regions based upon the visual obfuscation metric,
generate a new window position value based upon the original window size value, the respective region size values, the respective region position values, the respective content types of the plurality of different content regions, and the respective visual obfuscation metrics of the plurality of different content regions, and
generate a new window creation command comprising the original window size value and the new window position value, and forward the new window creation command to the GUI.

9. The computing system of claim 8 wherein the plurality of different content types comprises a transient content type, a static content type, and a blank content type.

10. The computing system of claim 9 wherein the classifying comprises masking the current screen of the GUI with a background image, and classifying matching content regions as the blank content type.

11. The computing system of claim 10 wherein the classifying comprises performing a transient content detection algorithm to classify non-matching content regions as the transient content type.

12. The computing system of claim 10 wherein the static content type comprises an active static content type and an inactive static content type; and wherein the classifying comprises processing historical GUI interaction to classify non-matching content regions as one of the active static content type and the inactive static content type.

13. A method of operating a graphical user interface (GUI) on a display, the GUI comprising a plurality of existing windows, the method comprising:
receiving a window creation command and a current screen of the GUI with the plurality of existing windows, the window creation command comprising an original window size value and an original window position value;
dividing the current screen of the GUI into a plurality of different content regions, each different content region having a region size value, and a region position value;
classifying each of the plurality of different content regions as a content type from a plurality of different content types;
generating a visual obfuscation metric for each of the plurality of different content regions based upon an amount of overlap for the original window size value positioned over a respective different content region, and the content type of the respective different content region;
sorting the plurality of different content regions based upon the visual obfuscation metric;
generating a new window position value based upon the original window size value, the respective region size values, the respective region position values, the respective content types of the plurality of different content regions, and the respective visual obfuscation metrics of the plurality of different content regions; and
generating a new window creation command comprising the original window size value and the new window position value, and forwarding the new window creation command to the GUI.

14. The method of claim 13 wherein the plurality of different content types comprises a transient content type, a static content type, and a blank content type.

15. The method of claim 14 wherein the classifying comprises masking the current screen of the GUI with a background image, and classifying matching content regions as the blank content type.

16. The method of claim 15 wherein the classifying comprises performing a transient content detection algorithm to classify non-matching content regions as the transient content type.

17. The method of claim 15 wherein the static content type comprises an active static content type and an inactive static content type; and wherein the classifying comprises processing historical GUI interaction to classify non-matching content regions as one of the active static content type and the inactive static content type.

18. A computing device comprising:
a display;
a processor coupled to said display and configured to
provide a graphical user interface (GUI) on said display, the GUI comprising a plurality of existing windows,
receive a window creation command and a current screen of the GUI with the plurality of existing windows, the window creation command comprising an original window size value and an original window position value,
divide the current screen of the GUI into a plurality of different content regions, each different content region having a region size value, and a region position value,
classify each of the plurality of different content regions as a content type from a plurality of different content types, the plurality of different content types comprising a transient content type, a static content type, and a blank content type,
generate a new window position value based upon the original window size value, the respective region size values, the respective region position values, and the respective content types of the plurality of different content regions, and
generate a new window creation command comprising the original window size value and the new window position value, and forward the new window creation command to the GUI.

19. A computing system comprising:
at least one server configured to provide a virtual computing session comprising a graphical user interface (GUI); and
a client computing device in communication with said at least one server and configured to access the virtual computing session via a communications network, and display the GUI comprising a plurality of existing windows;
said at least one server configured to
receive a window creation command and a current screen of the GUI with the plurality of existing windows, the window creation command comprising an original window size value and an original window position value,
divide the current screen of the GUI into a plurality of different content regions, each different content region having a region size value, and a region position value,
classify each of the plurality of different content regions as a content type from a plurality of different content types, the plurality of different content types comprising a transient content type, a static content type, and a blank content type, generate a new window position value based upon the original window size value, the respective region size values, the respective region position values, and the respective content types of the plurality of different content regions, and generate a new window creation command comprising the original window size value and the new window position value, and forward the new window creation command to the GUI.

20. A method of operating a graphical user interface (GUI) on a display, the GUI comprising a plurality of existing windows, the method comprising:

receiving a window creation command and a current screen of the GUI with the plurality of existing windows, the window creation command comprising an original window size value and an original window position value;

dividing the current screen of the GUI into a plurality of different content regions, each different content region having a region size value, and a region position value;

classifying each of the plurality of different content regions as a content type from a plurality of different content types, the plurality of different content types comprising a transient content type, a static content type, and a blank content type;

generating a new window position value based upon the original window size value, the respective region size values, the respective region position values, and the respective content types of the plurality of different content regions; and generating a new window creation command comprising the original window size value and the new window position value, and forwarding the new window creation command to the GUI.

* * * * *